Figure 1:
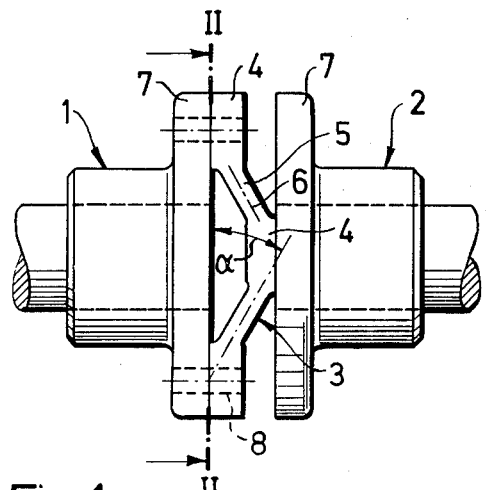

United States Patent [19]

Symann

[11] 3,874,195
[45] Apr. 1, 1975

[54] SHAFT COUPLINGS
[75] Inventor: Heinz-Georg Symann, Dortmund-Brackel, Germany
[73] Assignee: Kupplungstechnik GmbH, Westphalia, Germany
[22] Filed: Oct. 18, 1973
[21] Appl. No.: 407,444

[30] Foreign Application Priority Data
Nov. 25, 1972 Germany............................ 2257903

[52] U.S. Cl..................... 64/11 R, 64/12, 64/15 R, 64/27 R, 64/13
[51] Int. Cl............................................. F16d 3/17
[58] Field of Search............. 64/15 R, 15 B, 13, 12, 64/11, 27 R, 27 B, 175 P, 2 P

[56] References Cited
UNITED STATES PATENTS
| | | | |
|---|---|---|---|
| 1,752,106 | 3/1930 | Persons.................................. | 64/13 |
| 1,777,895 | 10/1930 | Roderick................................ | 64/12 |
| 2,860,495 | 11/1958 | Stark..................................... | 64/11 R |
| 3,332,255 | 7/1967 | Seagreaves et al................... | 64/11 R |
| 3,393,535 | 7/1968 | Morin..................................... | 64/11 R |
| 3,405,539 | 10/1968 | Tanaka................................... | 64/11 |
| 3,481,158 | 12/1969 | Mayerjak................................ | 64/12 |

Primary Examiner—Samuel Scott
Assistant Examiner—Randall Heald
Attorney, Agent, or Firm—Richards & Geier

[57] ABSTRACT

A shaft coupling comprising two shaft-mountable flanges by means of at least one resilient coupling member of synthetic material. The coupling member being formed integrally with a number of spaced apart bosses connected alternately with one or the other of the flanges. Adjacent pairs of bosses being staggered relatively to each other to maintain the coupling member spaced from both flanges. The coupling member is provided with bridge elements interconnecting the adjacent pairs of bosses and each bridge element has a longitudinal centreline which is inclined to a plane perpendicular to the axis of the coupling.

1 Claim, 6 Drawing Figures

SHAFT COUPLINGS

This invention relates to shaft couplings. More particularly, the invention relates to a shaft coupling which is an improvement in or modification of the shaft coupling described in our copending Patent application Ser. No. 369,245 hereinafter referred to as the Parent patent application.

According to the Parent patent application there is provided a shaft coupling comprising two shaft-mountable annular flanges and a resilient coupling member of synthetic material comprising a disk normal to the coupling axis and, integral with the disk, a plurality of bosses which having their axes parallel to the coupling axis and projecting alternately from opposite parallel faces of the disk for connection to the respective flanges by axially extending connecting elements, the bosses projecting from the respective faces of the disk in such a manner that the disk is spaced from both flanges so that it can be deflected by torque transmission in either direction.

The present invention seeks to improve the coupling of the parent patent by making possible larger deflection of the coupling member when the coupling is subjected to heavy loads.

The shaft coupling according to the present invention comprises two shaft-mountable flanges interconnected by means of at least one resilient coupling member of synthetic material, said coupling member or members being formed integrally with a number of peripherally spaced apart bosses connected alternately with one or the other of the flanges, adjacent pairs of bosses around the periphery of the or each coupling member being staggered relatively to each other in a direction parallel to the axis of the coupling to maintain the coupling member or members spaced from both flanges, in which the or each coupling member is provided with bridge elements interconnecting said adjacent pairs of axially staggered bosses, each bridge element having a longitudinal centreline which is inclined to a radial plane, that is, a plane perpendicular to the axis of the coupling.

By means of the invention the or each coupling member can deflect unhindered in response both to axial and angular relative movement of both coupled shafts, whereby the points of attachment of the staggered bosses to the respective flanges can move relatively to each other by deflection of the bridge elements.

The centreline of each bridge element may be straight or curved, and may include both straight and curved sections. The end points of the centre lines must, however, lie in different planes perpendicular to the axis of the coupling. Preferably the thickness of each boss, measured in the axial direction, is less that the axial distance between the ends of the centrelines of the bridge elements interconnecting the bosses, so that it is ensured that the coupling member remains axially deformable in its assembled position in the coupling. If the coupling has a number of coupling members connected to each other the same result is achieved if the points of connection of the staggered bosses to the respective flanges, or one to the other, are so arranged that the centrelines of the bridge elements are not parallel to those of the adjoining coupling member, but diverge therefrom. This arrangement also ensures that the coupling members maintain their spacing from one another and from the coupled flanges, allowing deflection of the bridge elements.

Figure 2:
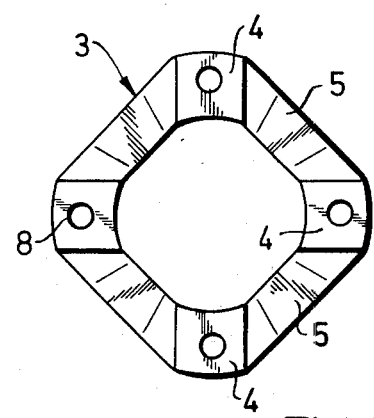
Figure 3:
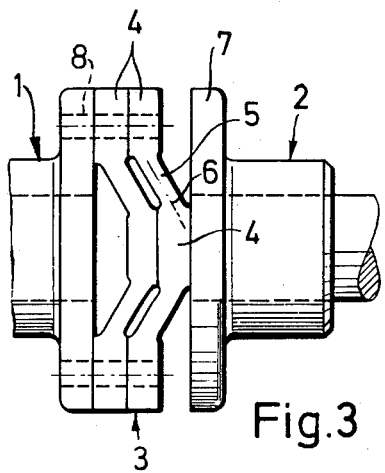
Figure 4:
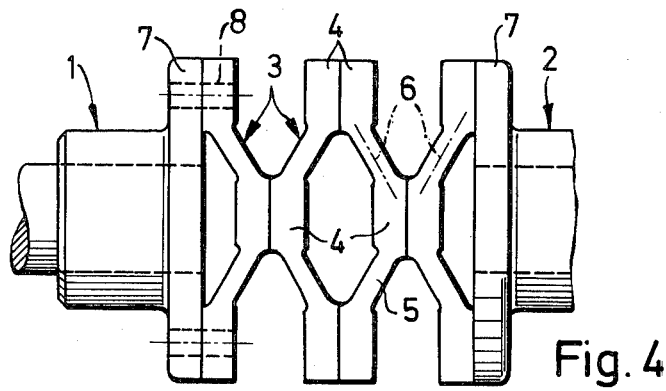
Figure 5:
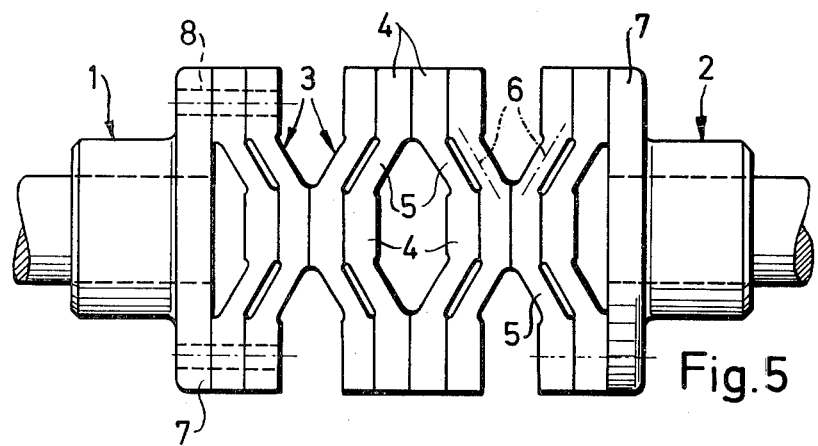
Figure 6:
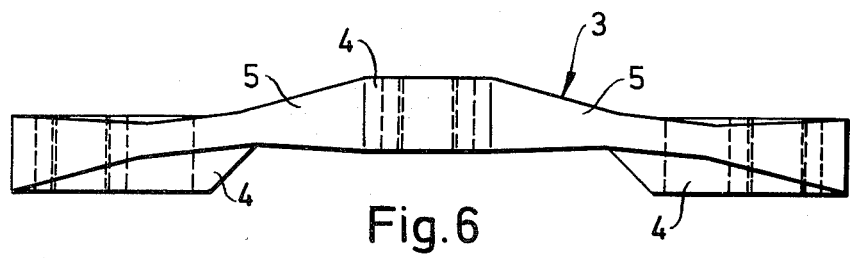

The invention will now be described, by way of non-limiting example, with reference to the attached drawings, in which:

FIG. 1 is a side view of a shaft coupling according to one embodiment of the invention having a single coupling member, FIG. 2 is a cross-sectional view of FIG. 1 taken on the line A—A of FIG. 1, FIG. 3 is a side view of a shaft coupling according to another embodiment of the invention, having two parallel coupling members, FIG. 4 is a side view of a coupling according to a further embodiment of the invention, having several coupling members arranged symmetrically, FIG. 5 is a side view of a shaft coupling according to a yet further embodiment of the invention, in which the flexible coupling member consists of several groups of parallel coupling members assembled in a symmetrical arrangement, and FIG. 6 is a side view of one of the coupling members employed in a coupling according to the invention.

The coupling shown in FIGS. 1 and 2 has a resilient coupling member 3 located between two shaft-mounted sleeves 1 and 2. The sleeves 1 and 2 have flanges 7, which face each other, the sleeves 1 and 2 being attached to respective drive and power take-off shafts to be coupled. The coupling member 3 has a square annular shape with bosses 4 at its corners. The bosses 4 at opposite corners of the coupling member 3 project in opposite axial directions and are connected, for example by bolts, to the drive and power take-off sleeves 1 and 2. The bosses 4 at adjacent corners of the coupling member 3 are interconnected by rectangular-section elongate bridge elements 5 which are inclined at an acute angle to the radial plane A—A, that is, a plane perpendicular to the axis of the coupling.

Each of the bridge elements 5 has a longitudinal centreline 6 which may be inclined at different angles to the radial plane A—A and which may be straight or curved. The radially inner and outer ends of the centrelines must, however, in all cases lie in different radial planes spaced along the longitudinal axis of the coupling. If the thickness of the relatively staggered bosses 4 is smaller, taken in the axial direction, than the axial separation of the ends of the centre lines 6, then in all cases the coupling member 3 when assembled is axially yieldable by virtue of deflection of the bridge elements 5.

The staggered bosses 4 of the coupling member 3 have such a thick cross-section that a large diameter through hole 8, large enough to receive a connecting bolt (not shown) can be provided in each boss 4 without impairing the stability of the latter. The cross-sections of the bridge elements 5 are so selected that the maximum deflection of these elements upon relative axial movement of the flanges 7 accurs near the midpoint of the bridge elements 5, remote from the bosses 4.

The annular coupling member 3 need not necessarily be of quadrilateral shape but may be circular in form.

If the coupling has to transmit greater torques, then according to the embodiment shown in FIG. 3, a number of, in this example, two, coupling members 3 are arranged coaxially in a 'stack' or in series so that the centrelines 6 of their bridge elements 5 are parallel to each other. The individual coupling members 3 are connected together through their bosses 4, which abut each other in pairs, one diametrically opposite pair of abutting bosses 4 being secured to one of the flanges 7 and the other, axially staggered, pair of diametrically opposite abutting bosses 4 being secured to the other flange 7. A single bolt may be used for connecting each pair of abutting bosses 4 to each other and to the respective flange 7.

According to the embodiment shown in FIG. 4, a plurality of individual coupling members 3 are arranged in symmetrical mirror image pairs in relation to each other, so that the centrelines 6 of the bridge elements 5 of adjoining pairs of members 3 diverge. The greater the number of coupling members 3, the greater is the overall flexibility of the coupling for accommodating relative displacement of the coupled shafts. The embodiment of FIG. 4 provides a coupling capable of spanning a greater distance between the ends of coupled shafts than the embodiments of FIGS. 1 and 3.

FIG. 5 shows flexible coupling according to the invention in which individual coupling members 3 are coupled together in pairs similar to the pair of members shown in FIG. 3, while adjacent said pairs are interconnected in a symmetrical mirror-image arrangement similar to that of FIG. 4.

This arrangement can transmit double the torque transmitted by the arrangement of FIG. 4, while on the other hand affording high flexibility and the possibility of spanning a wide inter-shaft distance.

FIG. 6 illustrates the preferred configuration of a coupling member 3 employed in a coupling according to the invention. Each of the bridge elements 5 between the individual staggered bosses 4 has a non-uniform cross-section, with a waisted central portion 5' of minimum cross section, so as to ensure that the maximum deflection of the bridge element 5 accurs in the region of the mid-point of the element.

The shaft coupling according to the invention has the advantage that the same basic components, namely the coupling members 3 such as that shown in FIG. 6, can be combined in different arrangements, as exemplified in FIGS. 1 to 5, to form single or multiple couplings according to the torque to be transmitted, the desired flexibility of the coupling and the axial separation of the shafts to be coupled.

What I claim is:

1. A coupling for connecting two shafts, comprising opposed flanges carried by adjacent ends of the two shafts, at least two resilient coupling members, each coupling member being substantially rectangular in shape and having at each corner a separate substantially rectangular boss with a hole and elongated bridge elements interconnecting said bosses, said bridge elements being rectangular in cross section and being substantially narrower than said bosses, said flanges having a plurality of holes, the holes of said flanges being in alinement with the holes of said bosses, said two coupling members being located in alinement with each other between said flanges, two alined holes of two bosses of the two coupling members being in alinement with a hole of one of said flanges, the following holes of the following bosses of the two coupling members being in alinement with a hole in the other one of said flanges, said bridge elements extending at an inclination to the axes of the two shafts, and means connecting the holes of said flanges with the alined holes of said bosses, wherein the cross-section of each bridge element is non-uniform, tapering gradually to a minimum cross-section in a central portion of the element intermediate its ends.

* * * * *